(12) United States Patent  (10) Patent No.: US 6,596,389 B1
Hallett et al.  (45) Date of Patent: Jul. 22, 2003

(54) FOAMED COMPOSITE PANEL WITH IMPROVED ACOUSTICS AND DURABILITY

(75) Inventors: Chester W. Hallett, North East, MD (US); John Felegi, Jr., Lancaster, PA (US); William F. Fry, Columbia, PA (US); Ernest B. Nute, Jr., Lancaster, PA (US); Robert D. Lewis, Landisville, PA (US); Alfred H. Adey, East Petersburg, PA (US)

(73) Assignee: AWI Licensing Company, Wilmington, DE (US)

( * ) Notice: Subject to any disclaimer, the term of this patent is extended or adjusted under 35 U.S.C. 154(b) by 196 days.

(21) Appl. No.: 09/690,266

(22) Filed: Oct. 17, 2000

Related U.S. Application Data

(60) Provisional application No. 60/159,987, filed on Oct. 18, 1999.

(51) Int. Cl.[7] .................................................. B32B 5/22
(52) U.S. Cl. .............................. 428/317.9; 428/315.5; 428/315.7; 428/292.1; 428/295.1; 428/297.4; 181/284; 181/286; 181/288; 181/294; 521/68; 521/134; 521/138; 521/84.1
(58) Field of Search ........................ 428/315.5, 315.7, 428/317.9, 292.1, 295.1, 297.4; 181/284, 286, 288, 294; 521/68, 134, 138, 84.1

(56) References Cited

U.S. PATENT DOCUMENTS

| | | | |
|---|---|---|---|
| 3,444,956 A | 5/1969 | Gaffney | 181/33 |
| 3,542,640 A | 11/1970 | Friedberg et al. | 162/101 |
| 3,871,952 A | 3/1975 | Robertson | 162/101 |
| 3,985,198 A * | 10/1976 | Kurtze et al. | 181/286 |
| 4,488,932 A | 12/1984 | Eber et al. | 162/9 |
| 4,551,384 A | 11/1985 | Aston et al. | 428/312.6 |
| 4,613,627 A * | 9/1986 | Sherman et al. | 106/122 |
| 5,134,179 A * | 7/1992 | Felegi, Jr. et al. | 162/145 |
| 5,250,153 A * | 10/1993 | Izard et al. | 162/152 |
| 5,277,762 A | 1/1994 | Felegi, Jr. et al. | 162/145 |
| 5,395,438 A | 3/1995 | Baig et al. | 106/214 |
| 5,558,710 A * | 9/1996 | Baig | 106/122 |
| 5,612,385 A | 3/1997 | Ceaser et al. | 521/68 |
| 5,720,851 A | 2/1998 | Reiner | 162/101 |
| 5,911,818 A * | 6/1999 | Baig | 106/122 |
| 6,171,388 B1 * | 1/2001 | Jobbins | 106/677 |

* cited by examiner

*Primary Examiner*—Terrel Morris
*Assistant Examiner*—Hai Vo
(74) *Attorney, Agent, or Firm*—Womble Carlyle Sandridge & Rice, PLLC

(57) ABSTRACT

An acoustical panel formed from a fibrous, open-celled material comprised of up to about 50% by weight fibers, between about 3% and about 10% by weight binder, between about 20% and about 75% by weight filler and about 0.01% to about 2.0% by weight surfactant. Additionally, voids are formed within the panel having an average distribution size diameter of about 50 $\mu$m to about 250 $\mu$m. The acoustic panel achieves very high sound absorption properties without the need for additional surface perforations, while maintaining a very high surface hardness.

19 Claims, 1 Drawing Sheet

FOAMED COMPOSITE PANEL WITH IMPROVED ACOUSTICS AND DURABILITY

CROSS REFERENCE TO RELATED APPLICATIONS

This application claims the benefit of U.S. Provisional Application No. 60/159,987, filed October 18, 1999.

FIELD OF THE INVENTION

The present invention relates to a composite material and method of its manufacture, wherein the composite material has improved acoustical and surface hardness properties for use as an acoustical panel.

BACKGROUND

The manufacture of wet-laid acoustical panels typically includes a wet process having separate dilute water streams of fiber, fillers and binder which are mixed together to create a slurry. The fibers are either organic or inorganic. Usually the fibers are inorganic for fire resistance. A typical binder is starch. Fillers may include newsprint (which also acts as a binder), clay, and perlite. A typical panel wet-forming process involves the successive steps of depositing a wet slurry onto a conveyor screen, draining water from the slurry through the screen. The process also includes suctioning for further water removal, press rolling for compressing out additional water and finally hot air drying the slurry as it is cast on the screen. Upon entering a drier, the wet panel typically has 60–70% water content.

One of the most important aspects of a ceiling board is its sound absorption function. Artisans have employed many different techniques to increase sound absorption of acoustic panels, including apertures, fissuring, and striating. The relative noise reduction capability is expressed in terms of a noise reduction coefficient (NRC). Historically, wet processed acoustical panels have not had a very high NRC when compared to dry processed ceiling boards, such as those made from fiberglass batts. However, there are many disadvantages associated with the use of fiberglass. Disadvantages include the cost of the fiberglass relative to natural fibers, complexity and costs associated with manufacturing fiberglass acoustical panels with organic binders, health and environmental concerns associated with the use of organic solvents and organic binders in the manufacture of fiberglass acoustic panels, and the lack of strength associated with acoustic panels having inner cores comprised of fiberglass batts.

In the manufacture of wet-process acoustical panels, sound absorbent composite materials should achieve an acceptable level of sound absorbency. This is usually done by reducing the density of the panel or increasing panel thickness. Competing with the requirement of high acoustical absorbency is the need for a relatively stiff material to provide sufficient structural integrity and sufficient surface hardness to resist punctures and dents which may occur during the manufacture, transport, installation or use of the product. Additionally, a minimum thickness is also desirable to lower the material cost associated with the manufacture of acoustical panels from the acoustically absorbent material.

Unfortunately, wet-process materials that exhibit sufficient stiffness and surface hardness are usually quite dense, have small and closed cells, and do not display acceptable sound absorption characteristics. Furthermore, wet-process materials with highly acoustical absorbent properties are much less dense due to increased porosity, and therefore do not exhibit sufficient stiffness and surface hardness properties required for acoustic panel applications. Additionally, since traditional wet-processing techniques require a vacuum drawn through a cross-section of the wet-laid material to remove water, a significant porosity size gradient arises through a cross-section of the panel, which further degrades the acoustic attenuation properties and strength of the finished panel.

Frequently, artisans will increase the relative amount of fibers within a composition to increase material porosity and sound absorbency of the material. However, formulations that contain high amounts of natural fibers such as cellulose in combination with high amounts of perlite normally cannot achieve a uniform distribution of large open-celled voids, because the cellulosic fibers collapse onto each other during the vacuum drying process. In addition, the vacuum process tends to order the fibers into a two-dimensional configuration parallel with a plane upon which the wet-laid material lies, which decreases multi-dimensional stiffness of the finished product. Finally, the perlite tends to separate from the fibers and float to the surface of the aqueous solution during the panel forming stage, further weakening the final product.

For example, U.S. Pat. No. 5,277,762 discloses a material and process of manufacturing which overcomes the problem of fiber collapse and perlite separation by floating the slurry prior to draining the water. The floating process allows the use of high levels of cellulose and perlite, but at a relatively low density to maintain the necessary high porosity. Although this process achieves a low-density material with desirable acoustical properties, the process produces boards having low surface hardness and stiffness.

Other references illustrate the achievement of structural integrity at the cost of lowering acoustical absorbency of the material. For example, U.S. Pat. No. 5,395,438 discloses an acoustical tile composition having no wool content and high levels of expanded perlite or mineral fillers with a starch gel binder to aid in mold forming of a structurally sound acoustic panel. Although the resulting acoustic panel displays acceptable hardness, the panel does not exhibit the noise reduction characteristics needed for an acoustical panel application due to the density of the panel.

Others have attempted to manufacture acoustic panels by utilizing a foaming process to achieve sufficient sound absorbency. For example, U.S. Pat. No. 3,444,956 discloses a latex, pigmented, foam-surfaced acoustical body. This overlay structure, although providing acoustical transparency to the baseboard, does not exhibit sufficient hardness for an acoustical panel application and is therefore not desirable.

Therefore, there is a need to create a modified wet-process for manufacturing a novel acoustical panel having a high acoustic absorbency, but with sufficient structural integrity and surface hardness to serve as an acoustical panel for use in ceilings and walls.

SUMMARY

The present invention provides for an acoustical panel formed from a fibrous, open-celled material comprising up to about 50% by weight fibers, between about 3% and about 10% by weight binder, between about 20% and about 75% by weight filler and about 0.01% to about 2.0% by weight surfactant. Additionally, voids are formed within the panel having an average distribution size diameter of about 50 $\mu$m to about 250 $\mu$m. The voids are distributed evenly throughout the panel with very little striation.

Furthermore, an acoustical panel comprising a dried open-celled material formed from an aerated foamed slurry is described. The aerated foamed slurry comprises on a wet percent weight basis up to about 30% by weight fibers, up to 6% by weight binder; about 3% to about 45% of a filler, about 40% to 70% by weight water and about 0.003% to about 1.2% by weight surfactant. The dried open celled material also has a dry density between about 10 lb/ft$^3$ and about 18 lb/ft$^3$ and a NRC factor of at least about 0.65.

A method of producing an acoustic panel comprises the steps of preparing a dry mixture of fibers, binder and filler and then conveying the dry mixture to a mixer. The method then mixes the dry mixture within the mixture to ensure proper distribution of the fiber, binder and filler. Next the dry mixture is combined with a water and surfactant to form a slurry. The slurry is then aerated to form a foamed slurry that is then dried. Voids are created as the foamed slurry dries. The voids have an average distribution size diameter of about 50 μm to about 250 μm.

Fibers suitable for use with the present invention may include, but are not limited to, organic fibers such as cellulosic fibers derived from wood or paper products. Additionally, the composition may also utilize inorganic fibers such as, but not limited to, fiberglass, metal slag wool, rock wool or mineral wool. Furthermore, examples of fillers may include, but are not limited to, clay, perlite, limestone, diatomaceous earth, talc, silicates or wollastonite. Additionally, the composition may include any typical binding material for acoustic paneling material including, but not limited to, cornstarch, modified starches, polyvinyl acetates, polystyrene acrylics, polystyrene butadiene.

The material comprising the acoustic panel derived from the ingredients mentioned above exhibits good acoustic and structural characteristics due to the process for manufacturing the material. The process comprises the step of dry blending the fibers, filler and binder until the fibers are well dispersed through out the dry mixture. A conveying device feeds the dry mix to a high-intensity mixer. Simultaneously, the water and surfactant are added to the dry mix. The mixing process sufficiently agitates the wet and dry mixtures to create a foamed slurry by incorporating air into the mixture. The mixer drives the aerated, foamed slurry down to a bottom portion of the mixer, into a pump and finally through an extrusion die. The extrusion die includes an elongated orifice for extruding a sheet of the foamed slurry onto a conveyor for drying. The extruded sheet is dried by conventional means and is then suitable for use as an acoustic panel.

In an alternative embodiment of the present invention, surfactant may be added as a foamed liquid for further facilitating the creation of a foamed slurry. The liquid, which would generally comprise water and surfactant, may be agitated to create a foam prior to its addition to the dry mixture. In still another embodiment, each material within the composition may be added via separate streams into the high-intensity mixer to create the foamed material.

Advantages of the present composition and process include full three-dimensional orientation of the fibers within the materials to ensure enhanced material strength and surface hardness. The relative range of void sizes within the slurry is narrow since a vacuum is not drawn through the slurry. Additionally, virtually no gradient in void size through the panel cross-section can be seen. The narrow void size range and the virtual elimination of a void size gradient across a cross-sectional thickness of the panel enhances the acoustic absorbency of the panel while increasing its mechanical strength.

DETAILED DESCRIPTION

Figure 1:
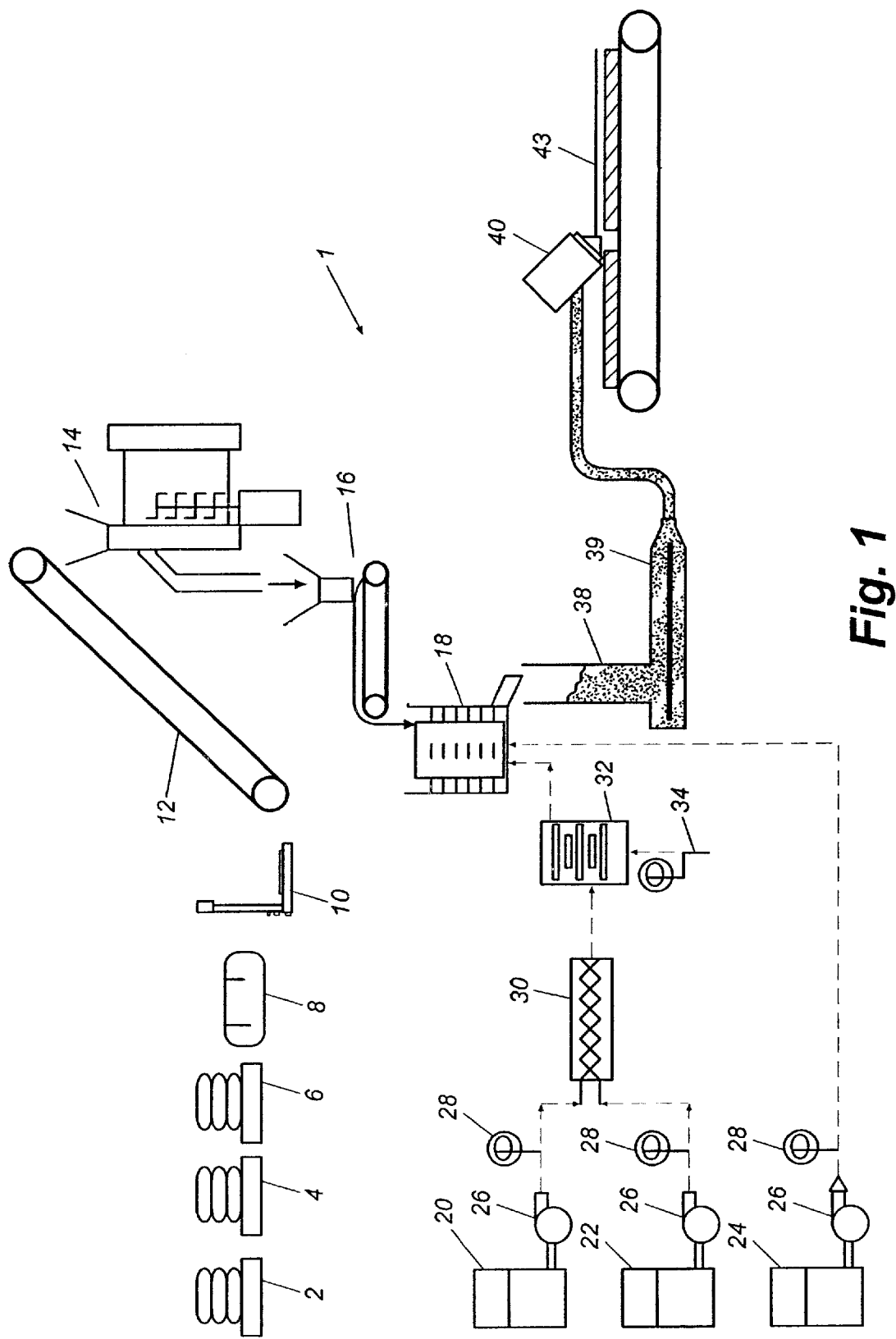
FIG. 1 schematically illustrates the process for producing the cementitious composite material of the present invention.

The present invention provides for an acoustical panel that combines strength with high noise reduction formed from a fibrous, open-celled material using a modified wet-formation process. The fibrous, open-celled material comprises up to about 50% by weight fibers, between about 3% and about 10% by weight binder, between about 20% and about 75% by weight filler, and about 0.01% to about 20% by weight surfactant. Additionally, voids are formed within the panel having an average distribution size diameter of about 50 μm to about 250 μm. The formed voids are distributed evenly throughout the panel with very little striation.

The composition for the acoustic panel includes a dry mix comprised of fiber material, filler material and binding material. Suitable fibers may include, but are not limited to, organic fiber material such as cellulosic fibers from wood or paper products. In an embodiment, the composition includes split cellulosic fibers derived from wood products for the fiber component. The composition may also utilize inorganic fibers such as, but not limited to, fiberglass, metal slag wool, rock wool or mineral wool. In an embodiment, the composition may include a filler comprised of clay and perlite. Other acceptable fillers may include, but are not limited to, limestone, diatomaceous earth, talc, silicates or wollastonite. Finally, the composition includes a binding material typical to acoustic panels including, but not limited to, cornstarch, modified starches, polyvinyl acetates, polystyrene acrylics, and polystyrene butadiene. The composition also includes a surfactant for inducing foaming of the ingredients.

The composition in a wet form may include 0% to about 30% by weight inorganic fibers, about 1.5% to about 21% by weight cellulosic fibers, about 3% to about 36% by weight clay, about 3% to about 45% by weight perlite, about 1.2% to about 6% by weight starch, 0% to about 6% by weight secondary binder and about 40% to 70% by weight water, and about 0.003% to about 1.2% by weight surfactant, with a dry density of about 10 lb/ft$^3$ to about 18 lb/ft$^3$. As set forth in the examples below, the composition may also include nonionic or anionic surfactants. The surfactants may include sodium laureth (1) sulfate (sold by Stepan Steol as CS 130), ammonium deceth (3) sulfate (sold by Stepan Cedepal as FA-406), a proprietary oligomeric blend (sold by Stepan as Alpha Foamer) or sodium dodecylbenzene sulfonate (sold by Stepan as Biosoft D-40). Such surfactants can be used in combination or alone to create the foam. A suitable surfactant is sodium dodecylbenzene sulfonate. A suitable secondary binder may include starch graft polystyrene acrylic, known commercially as Sequabond,® a registered trademark of Sequa Chemicals, Inc., of New York, N.Y. Other suitable secondary binders may include, but not limited to, any type of starch, polystyrene, polyvinyl acetate, polystyrene acrylics and styrene butadiene.

FIG. 1 schematically illustrates the process 1. The method comprises the steps of dry blending pre-weighed amounts of fiber 8, perlite 4, starch (or binder) 2 and clay 6 until the fibers are well dispersed within the dry mix. After weighing the ingredients on a scale 10, a weigh conveyor 12 feeds the dry ingredients to a mixer 14, through a hopper and onto a conveyor 16. Variable speed pumps 26 feed water 20 and surfactant 22 via flow measuring meters 28 to a static mixer 30. A high-intensity mixer 18 receives the dry mix, secondary binder 24, if any, and the water 20 and surfactant 22 mixture. Optionally, the water 20 and surfactant 22 can bypass the mixer 32 and be added directly into the static mixer 30. If the mixer 32 is used, air 34 is entrained in the water and surfactant to form a foam. The high-intensity mixer 18 creates a foam from the water 20, surfactant 22 and air (open to the atmosphere) to create a wet, foamed slurry. A column 38 receives the foamed mix and a positive displacement pump 39 feeds the foamed mix through a die 40. In an embodiment, Applicants have found that a high-intensity, continuous Autocon® mixing apparatus works well as a high-intensity mixer 18 for adding liquid to the dry mix and aerating the slurry. The Autocon® name is a registered trademark of Autocon Continuous Processing Systems, Inc. of Santa Rosa, Calif. The high-intensity mixer 18 essentially comprises two concentric, cylindrical drums. An inner drum rotates while the outer drum remains stationary. The cylindrical solid space between the drums defines the mixing volume. The inner drum includes impellers projecting into the mixing space to agitate and aerate the mix.

The weigh conveyor 16 feeds the dry mix to the high-intensity continuous mixer 18 while the inner mixer drum flings the water 20, surfactant 22 and secondary binder 24 into the dry mix from a point at about one-third (⅓) of the way down from the top of the rotating drum. The high-intensity mixer 18 at 800 rpm slings the liquid radially outward out from an axial center of the mixer 18 to create the wet slurry, while aerating the slurry to create a foamed slurry. In an embodiment, the mixer 18 drives the aerated, foamed slurry down to a bottom portion of the high-intensity continuous mixer and into the column 38, which is about four feet high, and leads to an inlet of the positive displacement pump 39. The positive displacement pump 39 pressurizes and feeds the foamed slurry to the extrusion die 40. The extrusion die 40 includes an elongated orifice for extruding a sheet 43 of the foamed slurry onto a screen conveyor for drying. In an alternative embodiment, the die may extrude the foamed slurry onto a pre-positioned scrim, a wet-formed conventional acoustic panel or directly onto the conveyor to form panels from the foamed wet slurry. Although the die orifice may comprise virtually any dimension, an embodiment includes a width of approximately twenty-four (24) inches and a height of approximately one-quarter (0.25) inch to approximately one and one quarter (1.25) inches.

In another embodiment, the process forms an acoustic panel or board from the foamed slurry that is approximately one quarter (0.25) to approximately one and one quarter (1.25) inches thick with a bulk density of approximately 12.0 lb./ft.$^3$ to approximately 15 lb./ft.$^3$, although densities may vary considerably depending upon the exact formulation. An acoustic panel formed from the aerated slurry may have a NRC of at least about 0.65, and a surface hardness of at least about 110 lbf. In an embodiment, the process may form the acoustic panel by molding the aerated slurry, or shaping the aerated slurry into panels with rollers or screed blades. Additionally, the process may also include the step of forming the aerated slurry into a preformed acoustic panel using extrusion, rollers and screed blades to create a composite acoustic panel.

The foamed slurry provides many cells or voids within the slurry. As the slurry is dried, the bubbles coalesce to form intersecting cells. Since the slurry does not need to be vacuum dried, fibers are left in a random, three-dimensional orientation, increasing the final composite material strength and surface hardness. Additionally, the lack of vacuum drying reduces or eliminates a void size gradient as a function of cross-sectional panel position. In an embodiment, the void size has a range of about 50 µm to about 250 µm.

In an alternative embodiment of the present invention, the mixer 32 may also prefoam the water and surfactant prior to being combined with the dry mix of fibers, filler and binder. A pump may then transmit the water-surfactant foam to the high-intensity mixer 18 where additional foaming can occur upon the additional agitation and aeration of the dry mixture.

For the purposes of clarity and for the comparison of performance characteristics of the panel and its process of manufacture, Applicants have measured the acoustic performance, surface hardness and cell size of several panel samples using standard techniques known in the art. More specifically, to compare the acoustic performance characteristics of the present invention to that of other art acoustic panels, Applicants measured the acoustic absorption properties of composite boards made in connection with the present invention directly in terms of the noise reduction coefficient (NRC), as mentioned in the background of the invention. Applicants derive the NRC from a standard test method in accordance to ASTM test designation C423-84a, whereby sound absorption is measured at a specific range of frequencies. Applicants also utilize the impedance and airflow resistance test measurements to measure the acoustic performance of the material. The impedance test utilizes standards and test specifications set forth in ASTM C384. The acoustical ohms airflow resistance test utilizes standards and test specifications set forth in ASTM C522-87.

To measure the surface hardness of an acoustical panel formed from the process, Applicants utilize a hardness test specification set forth in ASTM C367-95, Sections 2–7. More specifically, the ASTM C376-95 standard requires the recordation of a force required for two (2) inch diameter spheres to penetrate one-quarter (0.25) inch into the acoustic panel.

Finally, Applicants measured void size and distribution within each sample using a mercury intrusion porosimeter, having a model name of Micromeritics Autopore II 9220.

In each of the examples set forth below, Applicants compare the performance characteristics of the acoustic panel to similar performance characteristics of an acoustic panel disclosed in U.S. Pat. No. 5,395,438. The direct comparisons of relevant performance characteristics of the present invention to that of U.S. Pat. No. 5,395,438 demonstrate acoustic performance improvements while maintaining the surface hardness properties of the present invention. For the examples provided in this specification, Applicants have defined clay as having a minimum surface area of 10 sq. m$^2$/g. This is measured using nitrogen as the absorbate in the Micromeritics ASAP 2000 (BET Surface Area method).

The examples below are merely samples taken from acoustic panels manufactured in accordance with the process described above. The examples are not intended to limit the choices for material compositions that may comprise an acoustic panel manufactured in accordance with the present invention. The examples are also not intended to limit material properties associated with an acoustic panel manufactured in accordance with the process described in this specification. Unless otherwise stated, the percentages are weight percent dry.

|  | Foamed board | Example #5 Patent 5,395,438, |  |
| --- | --- | --- | --- |
| Wood Fiber | 13.89% | 4.90% | Bleached Kraft |
| Kaolin | 25.95% | 41.70% | Kaolin |
| Perlite | 51.78% | 41.70% | Perlite |
| Sequa SGS* | 1.73% |  |  |
| Tapioca Starch | 6.48% | 11.70% | Starch |
| Biosoft D40** | 0.17% |  |  |
| Thickness (in.) | 0.56 | 0.8 |  |
| Density (pcf) | 12.1 | 17.3 |  |
| NRC*** | 0.72 | 0.6 |  |
| Hardness (lbf) | 199 | 185 |  |

*polystyrene acrylic starch graft binder
**sodium dodecylbenzene sulfonate surfactant
***calculated from Impedance Tube, four ftequency average Applicants manufactured an acoustic panel in Example 1 according to an embodiment of the present invention. Example 1 illustrated above sets forth the various weight percentages of the constituents of the slurry. Applicants dry blended wood fiber, perlite, starch, binder and clay such that the fibers were well dispersed and all materials were well mixed. Applicants conveyed the dry mix to a high intensity mixer and then added the water and surfactant. The high intensity mixer pulled air into the slurry to generate a foamed slurry, as described in relation to FIG. 1. In Example 1, the foamed slurry exiting the mixer was about 65% water and about 35% solids on a weight basis. On a volume basis, the foamed slurry was about 39% water, about 21% solids and about 40% air. The board was formed by molding the foam into a sheet. This board was sanded to a thickness of about 0.56 inches with a bulk density of 12 lb/cu. ft. The acoustic panel manufactured in Example 1 above included a void size range of about 100 μm to about 150 μm.

|  | Foamed Board | Patent 5,395,438, Example #9-1 |  |
| --- | --- | --- | --- |
| Wood Fiber | 13.98% | 4.20% | Fiberglass |
| Kaolin | 26.11% | 38.80% | Perlite |
| Perlite | 41.75% | 39.80% | Gypsum |
| Fiberglass**** | 9.76% | 1.30% | Polystyrene |
| Sequa SGS* | 1.74% | 15.90% | Starch |
| Tapioca Starch | 6.52% |  |  |
| Biosoft D-40** | 0.14% |  |  |
| Thickness (in.) | 0.56 | 0.873 |  |
| Density (pcf) | 13.3 | 12.7 |  |
| NRC*** | 0.75 | 0.61 |  |
| Hardness (lbf) | 169 | 85 |  |

*polystyrene acrylic starch graft binder
**sodium dodecylbenzene sulfonate surfactant
***calculated from Impedance Tube, four frequency average
****Owens Corning ¼" 16 micron Applicants manufactured an acoustic panel in Example 2 according to an embodiment of the present invention. More specifically, Applicants dry blended the wood fiber, perlite, starch and clay such that the fibers were well dispersed and all materials were well mixed. Applicants conveyed the dry mix to a high intensity mixer and then added the water, binder and surfactant. The high intensity mixer pulled air into the slurry to generate foam. In Example 2, the foamed slurry exiting the mixer was about 65% water and about 35% solids on a weight basis. On a volume basis, the foamed slurry was about 39% water, about 21% solids, and about 40% air and molded into a hand-sheet to form the board. This board was sanded to a thickness of 0.56 inches with a bulk density of 13.3 lb./cu. ft.

The best comparison is to demonstrate the performance enhancement the overlay provides when applied to a typical, monolayer, and acoustical ceiling board. The following example of a foamed overlay on a high wool baseboard demonstrates the improvements in NRC with an additional improvement in hardness.

|  | Foamed Overlay | High Wool Board | Composite Board |
| --- | --- | --- | --- |
| Wood Fiber | 13.89% |  |  |
| Mineral Wool |  | 46.08% |  |
| Newsprint |  | 5.04% |  |
| Kaolin | 25.95% | 1.80% |  |
| Perlite | 51.78% | 14.40% |  |
| Sequa SGS* | 1.73% |  |  |
| Pearl Cornstarch |  | 4.68% |  |
| Tapioca Starch | 6.48% |  |  |
| Biosoft D40** | 0.17% |  |  |
| Dry Broke |  | 28.00% |  |
| Thickness (in.) | 0.225 | 0.63 | 0.855 |
| Density (pcf) | 13.2 | 13.6 | 13.4 |
| NRC*** | 0.64 |  | 0.74 |
| Hardness (lbf) | 113 | 94 | 113 |

(NRC for composite board is from a full scale test, four frequency average)
(hardness for the composite board is the value of the overlay tested separately)

The present invention provides improved acoustic performance and mechanical strength for the following reasons. The narrow range in sizes of the voids throughout the material allows for a consistent open-celled material structure for improved sound absorption. Additionally, the elimination of a void size gradient through a cross-section of the acoustic panel improves the acoustic performance of the panel by allowing for consistently open-celled material. Applicants also believe that the consistent open-celled structure of the present invention enhances the mechanical strength and surface hardness of the acoustic panel.

Applicants believe that the above-referenced mechanical properties are achieved due to the unique manufacturing process as described above. The manufacturing process provides for a high-intensity mixer which allows for mixing of all the dry ingredients prior to the addition of water and other liquids to the mix. The high-intensity mixer sufficiently agitates and aerates the wet and dry mixture to create an aerated slurry which is immediately extruded through a die to create a sheet, thereby allowing for the formation of a open-celled composite material having a narrow void size range and virtually no void size gradient as a function of cross-sectional position.

While Applicants have set forth embodiments as illustrated and described above, it is recognized that variations may be made with respect to relative weight percentages of various constituents in the composition. Therefore, while the invention has been disclosed in various forms only, it will be obvious to those skilled in the art that many additions, deletions and modifications can be made therein without departing from the spirit and scope of this invention, and that no undue limits should be imposed thereon except as set forth in the following claims.

What is claimed is:

1. An acoustical panel formed from a fibrous, open-celled material comprising:
   up to about 50% by weight dry fibers;
   between about 3% and about 10% by weight dry binder;
   between about 20% and about 75% by weight dry filler;
   about 0.01% to about 2.0% by weight dry surfactant; and the material having voids with an average distribution size diameter of about 50 μm to about 250 μm, wherein the panel has a NRC coefficient of at least 0.65 and a surface hardness of at least about 110 lbf.

2. The acoustic panel of claim 1, wherein the panel is formed from an aerated foamed slurry including a surfactant, fibers, binder and filler.

3. The acoustic panel of claim 1, wherein the surfactant is selected from the group consisting of sodium laureth sulfate, ammonium deceth sulfate and sodium dodecylbenzene sulfonate.

4. The acoustic panel of claim 1, wherein the filler is selected from the group consisting of kaolin clay, perlite, limestone, diatomaceous earth, talc, silicates and wollastonite.

5. The acoustic panel of claim 1, wherein the fibers are cellulosic fibers.

6. The acoustic panel of claim 1, wherein the fibers are selected from the group consisting of fiberglass, slag wool and rock wool.

7. The acoustic panel of claim 1, wherein the fibers are synthetic fibers.

8. The acoustic panel of claim 1, wherein the binder is selected from the group consisting of starch, polystyrene, polyvinyl acetate, polystyrene acrylics and styrene butadiene.

9. The acoustical panel of claim 1, wherein the panel has a density of about 12 lbs/ft$^3$ to about 15 lbs/ft$^3$.

10. An acoustical panel comprising:
   a dried open-celled material formed from an aerated foamed slurry comprising on a wet percent weight basis:
   up to about 30% by weight fibers;
   up to about 6% by weight binder;
   about 3% to about 45% by weight filler;
   about 40% to about 70% by weight water; and
   about 0.003% to about 1.2% by weight surfactant;
   the dried open celled material having a dry density between about 10 lb/ft$^3$ and about 18 lb/ft$^3$, a NRC factor of at least 0.65 and a surface hardness of at least about 110 lbf.

11. The acoustical panel of claim 10, further including voids formed within the panel having an average distribution size diameter of about 50 μm to about 250 μm.

12. The acoustic panel of claim 6, wherein the density of the dried open celled material is approximately 12 lb/ft$^3$ to approximately 15 lb/ft$^3$.

13. The acoustic panel of claim 10, wherein the aerated foamed slurry further includes a second surfactant.

14. The acoustic panel of claim 10, wherein the surfactant is selected from the group consisting of sodium laureth sulfate, ammonium deceth sulfate and sodium dodecylbenzene sulfonate.

15. The acoustic panel of claim 10, wherein the filler is selected from the group consisting of koalin clay, perlite, limestone, diatomaceous earth, talc, silicates and wollastonite.

16. The acoustic panel of claim 10, wherein the fibers are cellulosic fibers.

17. The acoustic panel of claim 10, wherein the fibers are selected from the group consisting of fiberglass, slag wool and rock wool.

18. The acoustic panel of claim 10, wherein the fibers are synthetic fibers.

19. The acoustic panel of claim 10, wherein the binder is selected from the group consisting of starch, polystyrene, polyvinyl acetate, polystyrene acrylics and styrene butadiene.

* * * * *